US012381907B2

(12) United States Patent
Douglas et al.

(10) Patent No.: US 12,381,907 B2
(45) Date of Patent: Aug. 5, 2025

(54) SYSTEMS AND METHODS FOR PREVENTING UNAUTHORIZED RESOURCE ACCESS

(71) Applicant: Capital One Services, LLC, McLean, VA (US)

(72) Inventors: Lawrence Douglas, McLean, VA (US); Jeffrey Rule, Chevy Chase, MD (US); Jackson Macomber, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 148 days.

(21) Appl. No.: 18/466,276

(22) Filed: Sep. 13, 2023

(65) Prior Publication Data

US 2025/0088529 A1 Mar. 13, 2025

(51) Int. Cl.
*H04L 9/40* (2022.01)
*G06F 21/53* (2013.01)

(52) U.S. Cl.
CPC .......... *H04L 63/1441* (2013.01); *G06F 21/53* (2013.01); *H04L 63/10* (2013.01); *H04L 63/1425* (2013.01)

(58) Field of Classification Search
CPC . H04L 63/1441; H04L 63/10; H04L 63/1425; H04L 63/1491; G06F 21/53
See application file for complete search history.

(56) References Cited

U.S. PATENT DOCUMENTS

| 2020/0089881 A1* | 3/2020 | Graun | G06F 21/565 |
| 2022/0255945 A1* | 8/2022 | Guan | H04L 63/102 |
| 2024/0184876 A1* | 6/2024 | Sawkar | G06F 21/32 |

* cited by examiner

*Primary Examiner* — Christopher B Robinson
*Assistant Examiner* — Tania M Pena-Santana
(74) *Attorney, Agent, or Firm* — Foley & Lardner LLP (57) ABSTRACT

Methods and systems for preventing unauthorized resource access. In some aspects, the system obtains, in real time, a first data stream between a user requesting access to resources in a user account and an agent. The system processes, using a first machine learning model, the first data stream to generate a confidence score. If the confidence score exceeds a threshold, the system generates a sandbox context configured to simulate output indicative of successful resource access. The system obtains a second data stream for the sandbox context and processes it using a second machine learning model to determine whether the communication between the agent and the user was malicious. If the communication was not malicious, the system removes the user account from the sandbox context and effects grant of resource access. Otherwise, the system reports the agent and the user account for further processing for attempts to obtain unauthorized user access.

19 Claims, 4 Drawing Sheets

SYSTEMS AND METHODS FOR PREVENTING UNAUTHORIZED RESOURCE ACCESS

SUMMARY

Identity theft is increasingly difficult to detect, especially when perpetrators have credentials matching a user account they are trying to access. Relying on human operators or service agents to detect malicious attempts to access user accounts can be insufficient, both due to imperfections and biases of human judgment and due to possibly malicious motives of the agents themselves.

Methods and systems are described herein for novel uses and/or improvements to artificial intelligence applications and in particular to detecting and responding to malicious attempts to access user accounts at a service by creating a controlled environment (or sandbox context) while using machine learning models to gauge the nature of the communication between a user attempting to obtain access and an agent of the service. By detecting attempts for unauthorized access of user accounts during the communication, the system can pre-empt damages arising from the unauthorized access being granted. Responding to suspected access requests using a sandbox context gives the system more time to process the communication to assess its integrity, while minimally inconveniencing bona fide attempts to access user accounts.

Existing systems have not contemplated using a software sandbox context to continue a conversation between a user attempting to obtain access and an agent of the service while maintaining flexibility on whether to actually grant the request to access the user account, pending the system's determination of the legitimacy of the request. Systems and methods herein process a first part of the data stream in a communication to determine whether to deploy the sandbox context. Having deployed the sandbox context, the system gathers a second part of the data stream while using the sandbox context to extend the conversation. The data stream is processed using a machine learning model to determine whether to grant the request to access the user account. Thus, systems and methods herein prevent unauthorized access to user accounts at minimal impact to real users, while collecting and reporting information on malicious actors.

In some aspects, a method for preventing unauthorized resource access by simulating communications to client devices associated with user accounts assigned a sandbox context is described, the method comprising: obtaining, in real time, a first data stream for a first communication between a user requesting access to resources in a user account and an agent; processing, using a first machine learning model, the first data stream to generate a confidence score; in response to the confidence score exceeding a confidence threshold, generating a sandbox context for the user account, the sandbox context configured to simulate output indicative of resource access being successful; in response to obtaining a second data stream for the sandbox context, processing, using a second machine learning model, the second data stream to determine whether a second communication between the agent and the user was malicious, wherein the second communication corresponds to the second data stream; in response to determining that the second communication was not malicious, removing the user account from the sandbox context and effecting grant of resource access; and in response to determining that the second communication was malicious, reporting the agent and the user account for further processing with respect to attempts for unauthorized user access.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
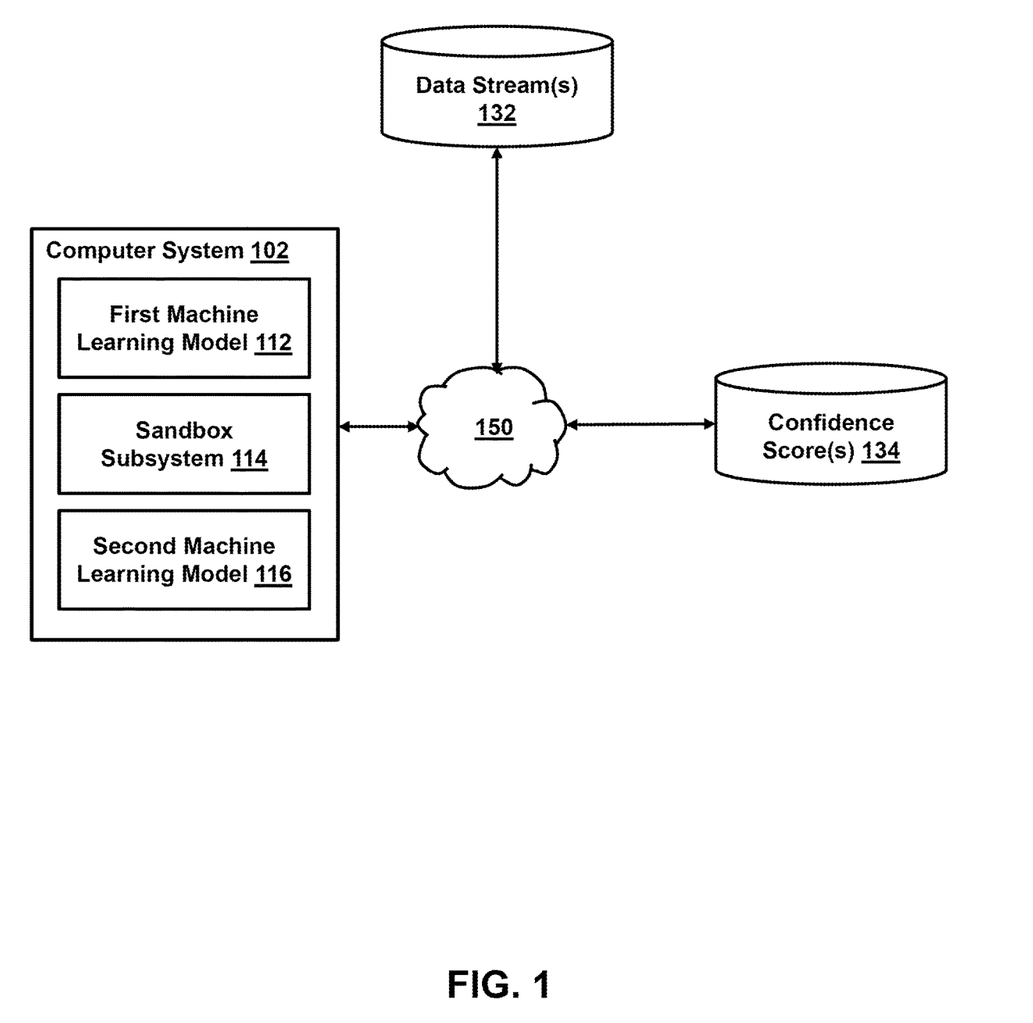
FIG. 1 shows an illustrative diagram for a system for preventing unauthorized access to accounts by simulating communications using a sandbox context, in accordance with one or more embodiments.

FIG. 1 shows an illustrative diagram for system 150, which contains hardware and software components used for preventing unauthorized access by simulating communications using a sandbox context, in accordance with one or more embodiments. For example, Computer System 102, a part of system 150, may include First Machine Learning Model 112, Sandbox Subsystem 114, and Second Machine Learning Model 116. Additionally, system 150 may create, store, and use Confidence Score(s) 134, and may access Data Stream(s) 132 in one or more contexts.

The system (e.g., system 150) may receive Data Stream(s) 132 in real time during a first communication between a user and an agent. The user may be attempting to access a service, log into an account, or access resources in association with an account. The agent may verify the identity of the user and ensure the integrity of any requests. The agent may be able to, for example, log the user into an account, or to grant access to resources including, e.g., credit or financial resources, etc. The user and the agent may establish a communication including, for example, a telephone call, a voice over IP call, a text chat, etc. The communication may include a data stream (e.g., Data Stream(s) 132) which may include, for example, audio or text data corresponding to the communication. Data Stream(s) 132 may include data such as information associated with a user account, an amount and type of resource for which access is requested, and personally identifiable information. Data Stream(s) 132 may also include or be associated with metadata, such as a location from which the user is calling or communicating, a current time, or a device that the user is using to communicate. In some embodiments, Data Stream(s) 132 may include a first portion and a second portion. For example, the first two minutes (or another suitable portion) of voice data of Data Stream(s) 132 and the metadata may comprise the first portion, and the remaining voice data may comprise the second portion. In some embodiments, a predetermined set of questions asked by the agent, and the responses to said questions by the user, comprise the first portion, and the remainder of Data Stream(s) 132 comprise the second portion. In some embodiments, audio data in Data Stream(s) 132 prior to the generation of a confidence score comprise a first portion, and audio data after the generation of the confidence score comprise the second portion.

The system may process Data Stream(s) 132 using a first machine learning model (e.g., First Machine Learning Model 112) to generate a confidence score (e.g., Confidence Score(s) 134). First Machine Learning Model 112 may take as input at least a first portion of the Data Stream(s) 132 and optionally a context vector including a location of the user, a current time, the user account, or the access to resources being requested. In some embodiments, one or more of the inputs to First Machine Learning Model 112 may be preprocessed. For example, the first portion of Data Stream(s) 132 may be transformed into real values using signal processing techniques. First Machine Learning Model 112 may use algorithms such as linear regression, random forests, or neural networks to produce a real number (e.g., Confidence Score(s) 134). Confidence Score(s) 134 may represent a probability that intervention in this communication between the user and the agent using a sandbox context will be considered necessary by the system. First Machine Learning Model 112 may be trained on historical data to perform quantitative prediction. The system may partition a historical dataset into a training set and a cross-validating set. Using the training set, the system may train First Machine Learning Model 112 using, for example, the gradient descent technique. The system may then cross-validate the trained model using the cross-validating set and further fine-tune the parameters of the model. First Machine Learning Model 112 may include one or more parameters that it uses to translate input into outputs. For example, an artificial neural network contains a matrix of weights, each weight in which is a real number. The repeated multiplication and combination of weights transform input values to First Machine Learning Model 112 into output values.

The system may compare Confidence Score(s) 134 to a threshold to determine the necessity of intervention with a sandbox context. The sandbox context may simulate certain aspects of the system related to granting access to resources, such as interface elements, without effecting grant to the user. In some embodiments, the threshold may be a fixed real value used across all communication from all users. In some embodiments, the threshold may be dynamically adjusted based on metadata associated with Data Stream(s) 132. In response to determining that Confidence Score(s) 134 exceeds the threshold, the system may generate a sandbox context (e.g., using Sandbox Subsystem 114). Sandbox Subsystem 114 may include software that may, for example, receive input from the agent or the user related to resource access. Sandbox Subsystem 114 may also simulate output indicative of resource access being successful. The simulated output may not actually cause the resource access to be granted. Sandbox Subsystem 114 may generate a sandbox context for each communication that the system deems in need of intervention.

In some embodiments, the sandbox context may replace the direct communication between the user and the agent regarding the resource access. For example, the user may be disconnected from the first communication by the sandbox context and replaced by a first voice model trained on the user's voice. In another example, the agent may be disconnected from the first communication by the sandbox context and replaced by a second voice model trained on the agent's voice. This replacement allows the sandbox context to control the conversation, while continuing to gather data from the user or the agent, including whether the user or the agent has malicious intent. The first and second voice models may, for example, include a natural language processing module and a text-to-speech module. The natural language processing module may, for example, be a machine learning model which takes as input the text of the communication in Data Stream(s) 132 and outputs, in real time, text tokens symbolizing words and sentences to respond to the conversation. The natural language processing module may be a deep neural network, for example. The text-to-speech module takes the text tokens output by the natural language processing module and generates sound to imitate a live person saying words and sentences corresponding to the text tokens. The text-to-speech module may take Data Stream(s) 132 as input in order to learn the voices of the user and the agent. Additionally, the text-to-speech module may be trained on a large corpus of voice data labeled with the words being uttered. The text-to-speech module may also be a deep neural network.

The sandbox context may simulate output to present to the user, the simulated output indicating that the resource access was successful. The sandbox context may prevent the request for resource access to effect any grant to the user. In some embodiments, the sandbox context has no authorization to distribute resources from an account. The sandbox context may simulate output such as a receipt indicating that resource access was successful. For example, the sandbox context may generate an electronic receipt displayed on a user interface to the user, the receipt indicating that the requested amount of resources has been added to a destination account. Alternatively, the sandbox context may simulate output such as a notice indicating that resource access will be granted at a specified future time. For example, the sandbox context may generate an electronic notice displayed on a user interface to the user, the notice indicating that the requested amount of resources will have been added to a destination account, for example, at the end of the business day. In some embodiments, the user may be calling to get access to an authentication mechanism associated with an account. For example, the user may be requesting a passcode that grants them the right to access any resources within an account at will. The sandbox context may simulate output such as a decoy passcode that grants the user access to the user account and which disables transferring any resources in association with the user account. For example, the decoy passcode may be set to expire after one use, or after a set period of time. The decoy may be separate from regular login passcodes, which grant permanent access to the account and the resources within.

The system may process, using a second machine learning model (e.g., Second Machine Learning Model 116), the second part of Data Stream(s) 132 to determine whether the communication between the agent and the user was malicious. Second Machine Learning Model 116 may take as input the second part of Data Stream(s) 132, a user context vector, and an agent context vector. In some embodiments, Second Machine Learning Model 116 may use all of Data Stream(s) 132. The user context vector includes past activity in the user account and past requests for resource access associated with the user account. For example, the user context vector may include all requests for resource access in the user account for the last 30 days, any resource transfers into or out of the user account in the same period, or any requests for resource access in any account from the location of the user. The agent context vector may include past requests for resource access associated with the agent. For example, the agent context vector may include past attempts to access resources in any account which the agent handled, and the results of said attempts, including the amount of resources distributed. Second Machine Learning Model 116 may use an algorithm such as logistic regression or support vector machine to process Data Stream(s) 132, the user context vector, and the agent context vector to generate a classification on the communication. Second Machine Learning Model 116 may inform the system as to whether the communication was malicious or not malicious. In some embodiments, Second Machine Learning Model 116 may output both whether the agent has malicious intent and/or whether the user has malicious intent in the communication.

If the system determines that the communication was not malicious, the system may remove the user account from the sandbox context and effect the requested grant of resource access. The system may de-activate the sandbox context and re-establish the communication between the user and the agent. Additionally, the system may perform steps to remedy the sandbox context not following through with the resource access. Having determined the communication was not malicious, the system may take the action indicated in the simulated output that the sandbox context displayed to the user. For example, the sandbox context may generate an electronic receipt indicating that the requested amount of resources has been added to a destination account. After the removal of the sandbox context, the system may require the agent to confirm the request for grant of resource access. The agent may check with the user regarding the amount or destination of the resources. The agent may then transmit a resource access order to a resource access processing system. The resource access processing system will move the requested amount of resources into the destination account.

In another example, the sandbox context may simulate output such as a notice indicating that resource access will be granted at a specified future time. After determining that the request was bona fide, the system may request a clearinghouse system to complete the requested resource access at the specified future time. By doing so, the system fulfills the user's request and poses no inconvenience through using the sandbox context.

In another example, the sandbox context may simulate output such as a decoy passcode that grants the user access to the user account and which disables transferring any resources in association with the user account. For example, the sandbox context may set the decoy passcode to expire after one use, or after a set period of time. After removing the sandbox context, the system may permanently enable the decoy passcode, and enable transferring resources in association with the user account. By doing so, the system grants access to the account to a user who should have such access.

If the system determines that the communication was malicious, the system may report the agent and the user account for further processing with respect to attempts for unauthorized user access. For example, the system may bar the user's IP address or phone number for communicating with respect to requesting resource access for a period of time. The system may report the user's IP address or phone number to law enforcement. The system may send an alert to an internal monitoring and disciplinary mechanism if the agent was found to have malicious intent. In some embodiments, the system may choose to flag users or agents found to act maliciously and continue to monitor their behavior to learn about patterns of malicious resource access attempts.

Figure 2:
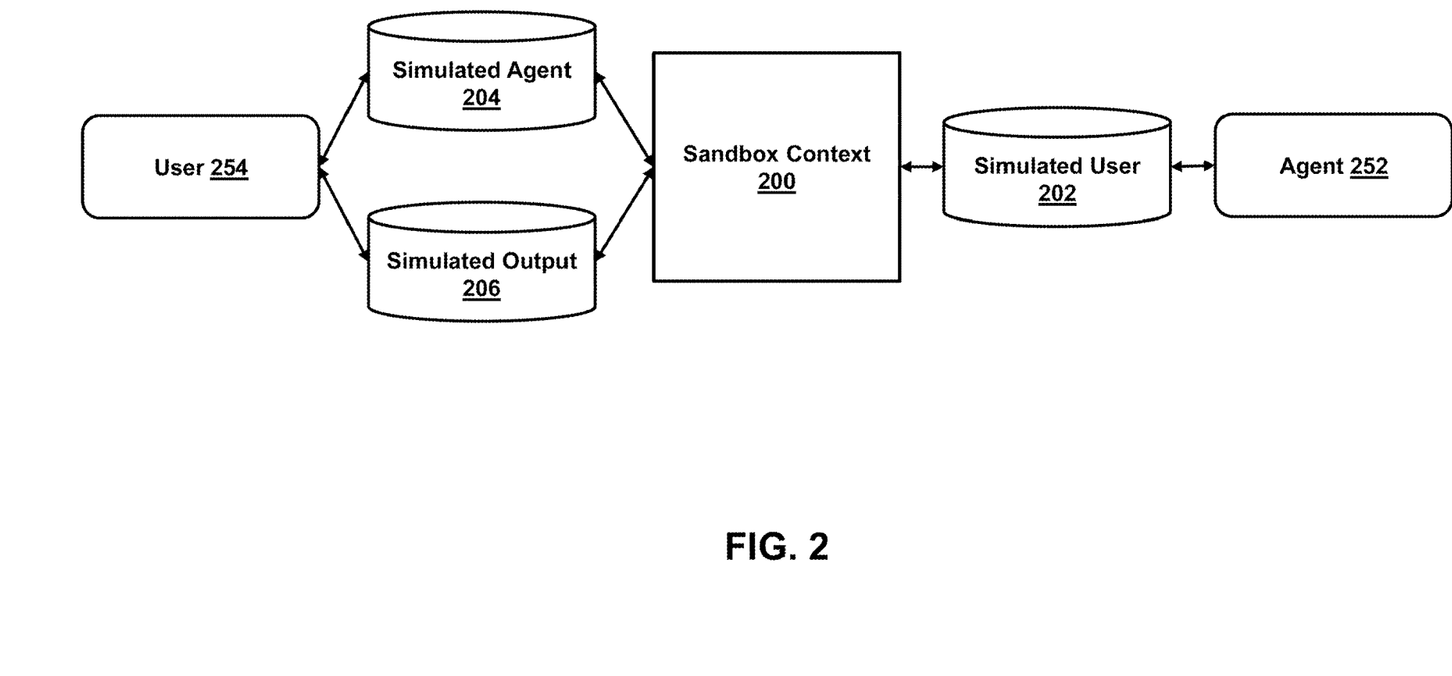
FIG. 2 shows an illustration of a sandbox context proxying the communication between a user and an agent, in accordance with one or more embodiments.

FIG. 2 is a demonstration of a sandbox context being deployed to manage the communication between Agent 252 and User 254. For example, User 254 may be on a telephone call with Agent 252 to discuss accessing resources in an account (e.g., wiring some funds out of a bank account). The conversation so far may have included Agent 252 asking for biographical information from User 254. In response to the system determining a confidence score for the communication exceeding a threshold, Sandbox Context 200 may be deployed to contain and control the conversation.

Sandbox Context 200 may replace the real-person communication between Agent 252 and User 254. Instead, Sandbox Context 200 generates Simulated User 202 to interact with Agent 252. Simultaneously, Sandbox Context 200 generates Simulated Agent 204 to interact with User 254. Simulated User 202 and Simulated Agent 204 are software programs intended to mimic the communication such that User 254 believes they are still communicating with Agent 252, and that Agent 252 believes they are still communicating with User 254. For example, Simulated Agent 204 may ask questions at User 254 requesting details on certain authentication information. For example, Simulated User 202 may make requests to Agent 252 requesting additional resources and providing information in response to questions from Agent 252. Simulated Agent 204 may not actually grant User 254's requests. Sandbox Context 200 may also sever Agent 252's connection to backend servers processing resource access for the duration of the communication. Instead, Simulated User 202 and Simulated Agent 204 collect data representing the responses of Agent 252 and User 254 to questions or suggestions made by the system. For example, Simulated Agent 204 may ask for information that Agent 252 neglected to request from User 254.

Simulated User 202 and Simulated Agent 204 may use a natural language processing module and a text-to-speech module. The natural language processing module may, for example, be a machine learning model which takes as input the text of the communication in Data Stream(s) 132 and outputs, in real time, text tokens symbolizing words and sentences to respond to the conversation. The natural language processing module may be a deep neural network, for example, trained to perform next-token prediction. The text-to-speech module takes the text tokens output by the natural language processing module and generates sound to imitate a live person saying words and sentences corresponding to the text tokens. The text-to-speech module may take Data Stream(s) 132 as input in order to learn the voices of the user and the agent.

Sandbox Context 200 may generate Simulated Output 206 for User 254, for example, to reassure User 254 that their request has been fulfilled. In fact, Sandbox Context 200 may not grant the request for resources access, and Simulated Output 206 is merely an electronic notice. In some embodiments, Sandbox Context 200 may not have access to backend systems that enact transfers or grant access to resources. Simulated Output 206 may convince User 254 that their request for resource access has been satisfied and may be shown at a point in the conversation that the system deems appropriate. Simulated Output 206 may be a receipt indicating that resource access was successful. For example, Simulated Output 206 may be an electronic receipt displayed on a user interface to the user, the receipt indicating that the requested amount of resources have been added to a destination account. Alternatively, Simulated Output 206 may be a notice indicating that resource access will be granted at a specified future time. For example, Simulated Output 206 may be a notice indicating that the requested amount of resources will have been added to a destination account, for example, at the end of the business day. In some embodiments, the user may be calling to get access to an authentication mechanism associated with an account. For example, the user may be requesting a passcode that grants them the right to access any resources within an account at will. Simulated Output 206 may include a decoy passcode that grants the user access to the user account and which disables transferring any resources in association with the user account. For example, the decoy passcode may be set to expire after one use, or after a set period of time.

If the system determines that the communication was not malicious, Sandbox Context 200 may be deactivated. In some embodiments, the system may end the communication at that moment. In other embodiments, the system may allow the conversation between Agent 252 and User 254 to continue by removing Simulated User 202 and Simulated Agent 204.

Figure 3:
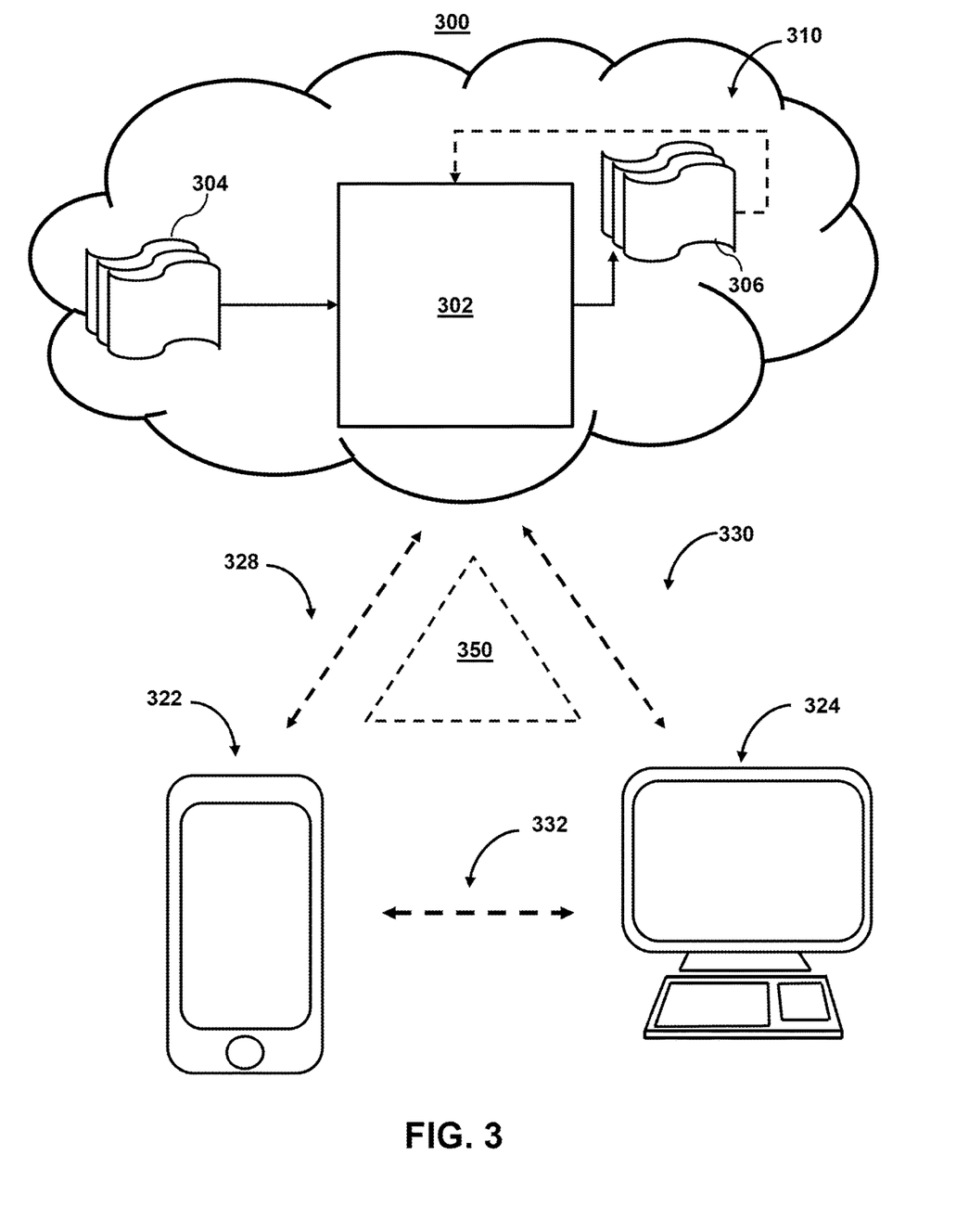
FIG. 3 shows illustrative components for a system for preventing unauthorized access to accounts by simulating communications using a sandbox context, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predicting resource allocation values for user systems).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., predicting resource allocation values for user systems).

In some embodiments, the model (e.g., model 302) may automatically perform actions based on outputs 306. In some embodiments, the model (e.g., model 302) may not perform any actions. The output of the model (e.g., model 302) may be used to predict predicting resource allocation values for user systems).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

Figure 4:
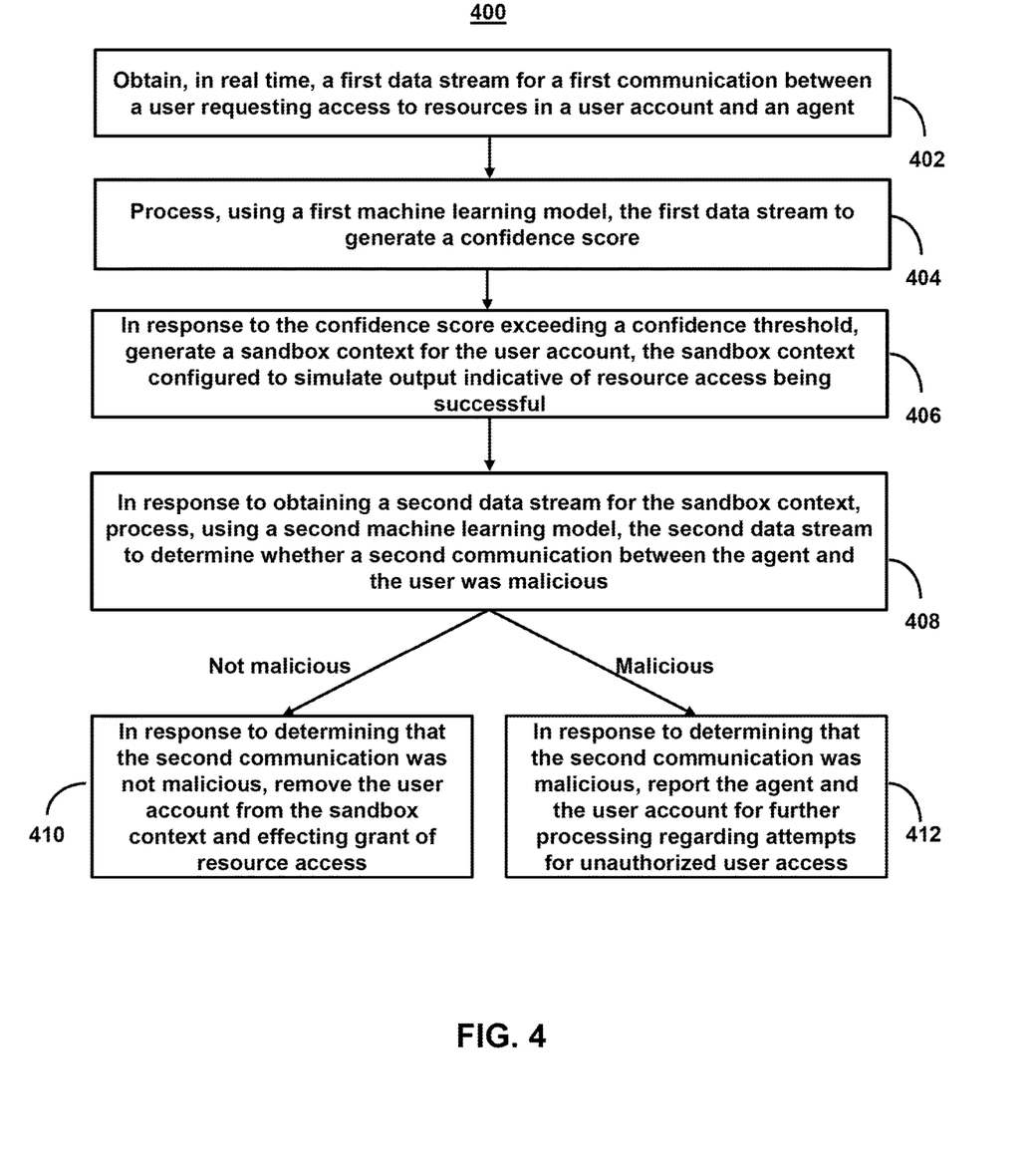
FIG. 4 shows a flowchart of the steps involved in preventing unauthorized access to accounts by simulating communications using a sandbox context, in accordance with one or more embodiments.

FIG. 4 shows a flowchart of the steps involved in preventing unauthorized access to accounts by simulating communications using a sandbox context, in accordance with one or more embodiments. For example, the system may use process 400 (e.g., as implemented on one or more system components described above) in order to process a data stream from a communication, generate a confidence score, deploy a sandbox context, and detect malicious intent, if any.

At step 402, process 400 (e.g., using one or more components described above) may obtain, in real time, a first data stream for a first communication between a user requesting access to resources in a user account and an agent. The system (e.g., system 150) may receive Data Stream(s) 132 in real time during a first communication between a user and an agent. The user may be attempting to access a service, log into an account, or access resources in association with an account. The agent may verify the identity of the user and ensure the integrity of any requests. The agent may be able to, for example, log the user into an account, or to grant access to resources. The user and the agent may establish a communication, for example a telephone call. The communication may include a data stream (e.g., Data Stream(s) 132) which may include, for example, sound data corresponding to the telephone call. Data Stream(s) 132 may include data such as information associated with a user account, an amount and type of resource for which access is requested, and personally identifiable information. Data Stream(s) 132 may also include or be associated with metadata, such as a location from which the user is calling or communicating, a current time, or a device that the user is using to communicate. In some embodiments, Data Stream(s) 132 may include a first portion and a second portion. For example, the first two minutes of voice data of Data Stream(s) 132 and the metadata may comprise the first portion, and the remaining voice data may comprise the second portion. In some embodiments, a set number of questions asked by the agent, and the responses to said questions by the user, comprise the first portion, and the remainder of Data Stream(s) 132 comprise the second portion. In some embodiments, voice data in Data Stream(s) 132 prior to the generation of a confidence score comprise a first portion, and voice data after the generation of the confidence score comprise the second portion.

At step 404, process 400 (e.g., using one or more components described above) may, process, using a first machine learning model, the first data stream to generate a confidence score. The system may process Data Stream(s) 132 using a first machine learning model (e.g., First Machine Learning Model 112) to generate a confidence score (e.g., Confidence Score(s) 134). First Machine Learning Model 112 may take as input at least a first portion of the Data Stream(s) 132 and optionally a context vector including a location of the user, a current time, the user account, or the access to resources being requested. In some embodiments, one or more of the inputs to First Machine Learning Model 112 may be pre-processed. For example, the first portion of Data Stream(s) 132 may be transformed into real values using signal processing techniques. First Machine Learning Model 112 may use algorithms such as linear regression, random forests, or neural networks to produce a real number (e.g., Confidence Score(s) 134). Confidence Score(s) 134 may represent a probability that intervention in this communication between the user and the agent using a sandbox context will be considered necessary by the system. First Machine Learning Model 112 may be trained on historical data to perform quantitative prediction. The system may partition a historical dataset into a training set and a cross-validating set. Using the training set, the system may train First Machine Learning Model 112 using, for example, the gradient descent technique. The system may then cross-validate the trained model using the cross-validating set and further fine-tune the parameters of the model. First Machine Learning Model 112 may include one or more parameters that it uses to translate input into outputs. For example, an artificial neural network contains a matrix of weights, each weight in which is a real number. The repeated multiplication and combination of weights transform input values to First Machine Learning Model 112 into output values.

At step 406, process 400 (e.g., using one or more components described above) may, in response to the confidence score exceeding a confidence threshold, generate a sandbox context for the user account, the sandbox context configured to simulate output indicative of resource access being successful. The system may compare Confidence Score(s) 134 to a threshold to determine the necessity of intervention with a sandbox context. In some embodiments, the threshold may be a fixed real value used across all communication from all users. In some embodiments, the threshold may be dynamically adjusted based on metadata associated with Data Stream(s) 132. In response to determining that Confidence Score(s) 134 exceed the threshold, the system may generate a sandbox context (e.g., using Sandbox Subsystem 114). Sandbox Subsystem 114 may include software which may, for example, receive input from the agent or the user related to resource access. Sandbox Subsystem 114 may also simulate output indicative of resource access being successful. The simulated output may not actually cause the resource access to be granted. Sandbox Subsystem 114 may generate a sandbox context for each communication that the system deems in need of intervention. The sandbox context may replace the direct communication between the user and the agent regarding the resource access. For example, the user may be disconnected from the first communication by the sandbox context and replaced by a first voice model trained on the user's voice. In another example, the agent may be disconnected from the first communication by the sandbox context and replaced by a second voice model trained on the agent's voice. This replacement allows the sandbox context to control the conversation, while continuing to gather data from the user or the agent, including whether the user or the agent has malicious intent. The first and second voice models may, for example, include a natural language processing module and a text-to-speech module. The natural language processing module may, for example, be a machine learning model which takes as input the text of the communication in Data Stream(s) 132 and outputs, in real time, text tokens symbolizing words and sentences to respond to the conversation. The natural language processing module may be a deep neural network, for example. The text-to-speech module takes the text tokens output by the natural language processing module and generates sound to imitate a live person saying words and sentences corresponding to the text tokens. The text-to-speech module may take Data Stream(s) 132 as input in order to learn the voices of the user and the agent. Additionally, the text-to-speech module may be trained on a large corpus of voice data labeled with the words being uttered. The text-to-speech module may also be a deep neural network.

The sandbox context may simulate output to present to the user, the simulated output indicating that the resource access was successful. The sandbox context may prevent the request for resource access to effect any grant to the user. In some embodiments, the sandbox context has no authorization to distribute resources from an account. The sandbox context may simulate output such as a receipt indicating that resource access was successful. For example, the sandbox context may generate an electronic receipt displayed on a user interface to the user, the receipt indicating that the requested amount of resources have been added to a destination account. Alternatively, the sandbox context may simulate output such as a notice indicating that resource access will be granted at a specified future time. For example, the sandbox context may generate an electronic notice displayed on a user interface to the user, the notice indicating that the requested amount of resources will have been added to a destination account, for example, at the end of the business day. In some embodiments, the user may be calling to get access to an authentication mechanism associated with an account. For example, the user may be requesting a passcode which grants them the right to access any resources within an account at will. The sandbox context may simulate output such as a decoy passcode which grants the user access to the user account and which disables transferring any resources in association with the user account. For example, the decoy passcode may be set to expire after one use, or after a set period of time. The decoy may be separate from regular login passcodes, which grant permanent access to the account and the resources within.

At step 408, process 400 (e.g., using one or more components described above) may, in response to obtaining a second data stream for the sandbox context, process, using a second machine learning model, the second data stream to determine whether a second communication between the agent and the user was malicious, wherein the second communication corresponds to the second data stream. The system may process, using a second machine learning model (e.g., Second Machine Learning Model 116), the second part of Data Stream(s) 132 to determine whether the communication between the agent and the user was malicious. Second Machine Learning Model 116 may take as input the second part of Data Stream(s) 132, a user context vector, and an agent context vector. In some embodiments, Second Machine Learning Model 116 may use all of Data Stream(s) 132. The user context vector includes past activity in the user account and past requests for resource access associated with the user account. For example, the user context vector may include all requests for resource access in the user account for the last 30 days, any resource transfers into or out of the user account in the same period, or any requests for resource access in any account from the location of the user. The agent context vector may include past requests for resource access associated with the agent. For example, the agent context vector may include past attempts to access resources in any account which the agent handled, and the results of said attempts, including the amount of resources distributed. Second Machine Learning Model 116 may use an algorithm such as logistic regression or support vector machine to process Data Stream(s) 132, the user context vector, and the agent context vector to generate a classification on the communication. Second Machine Learning Model 116 may inform the system as to whether the communication was malicious or not malicious. In some embodiments, Second Machine Learning Model 116 may output both whether the agent has malicious intent and/or whether the user has malicious intent in the communication.

At step 410, process 400 (e.g., using one or more components described above) may, in response to determining that the second communication was not malicious, remove the user account from the sandbox context and effecting grant of resource access. If the system determines that the communication was not malicious, the system may remove the user account from the sandbox context and effect the requested grant of resource access. The system may de-activate the sandbox context and re-establish the communication between the user and the agent. Additionally, the system may perform steps to remedy the sandbox context not following through with granting the resource access. Having determined the communication was not malicious, the system may take the action indicated in the simulated output that the sandbox context displayed to the user. For example, the sandbox context may generate an electronic receipt indicating that the requested amount of resources have been added to a destination account. After removal of the sandbox context, the system may require the agent to confirm the request for grand of resource access. The agent may check with the user regarding the amount or destination of the resources. The agent may then transmit a resource access order to a resource access processing system. The resource access processing system will move the requested amount of resources into the destination account.

In another example, the sandbox context may simulate output such as a notice indicating that resource access will be granted at a specified future time. After determining that the request was bona fide, the system may request a clearinghouse system to complete the requested resource access at the specified future time. By doing so, the system fulfills the user's request and poses no inconvenience through using the sandbox context.

In another example, the sandbox context may simulate output such as a decoy passcode which grants the user access to the user account and which disables transferring any resources in association with the user account. For example, the sandbox context may set the decoy passcode to expire after one use, or after a set period of time. After removing the sandbox context, the system may permanently enable the decoy passcode, and enable transferring resources in association with the user account. By doing so, the system grants access to the account to a user who should have such access.

At step 412, process 400 (e.g., using one or more components described above) may, in response to determining that the second communication was malicious, report the agent and the user account for further processing with respect to attempts for unauthorized user access. If the system determines that the communication was malicious, the system may report the agent and the user account for further processing with respect to attempts for unauthorized user access. For example, the system may bar the user's IP address or phone number for communicating with respect to requesting resource access for a period of time. The system may report the user's IP address or phone number to law enforcement. The system may send an alert to an internal monitoring and disciplinary mechanism if the agent was found to have malicious intent. In some embodiments, the system may choose to flag users or agents found to act maliciously and continue to monitor their behavior to learn about patterns of malicious resource access attempts.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for preventing unauthorized resource access by simulating communications from a service to client devices associated with user accounts assigned a sandbox context, the method comprising: obtaining, in real time, a first data stream for a first communication between a user associated with a user account and an agent of a service; processing, using a first machine learning model, the first data stream to generate a confidence score regarding whether to assign a sandbox context to the user account, the first machine learning model trained to detect in real time from the first data stream a malicious intent of the user to obtain unauthorized resource access from the service; in response to the confidence score exceeding a confidence threshold, generating a sandbox context for the user account, the sandbox context configured to receive input from the agent or the user related to resource access and simulate output indicative of resource access being successful, wherein the simulated output includes user-facing communication but does not effect grant of resource access by the service; in response to obtaining a second data stream for a second communication for the sandbox context, processing, using a second machine learning model, the second data stream to determine whether the second communication between the agent and the user was malicious due to the user obtaining unauthorized resource access from the service; in response to determining that the second communication was not malicious, removing the user account from the sandbox context and effecting grant of resource access by the service; and in response to determining that the second communication was malicious, reporting the agent and the user account for further processing with respect to attempts for unauthorized user access.

2. A method for preventing unauthorized resource access by simulating communications to client devices associated with user accounts assigned a sandbox context, the method comprising: obtaining, in real time, a first data stream for a first communication between a user requesting access to resources in a user account and an agent; processing, using a first machine learning model, the first data stream to generate a confidence score; in response to the confidence score exceeding a confidence threshold, generating a sandbox context for the user account, the sandbox context configured to simulate output indicative of resource access being successful; in response to obtaining a second data stream for a second communication for the sandbox context, processing, using a second machine learning model, the second data stream to determine whether the second communication between the agent and the user was malicious; in response to determining that the second communication was not malicious, removing the user account from the sandbox context and effecting grant of resource access; and in response to determining that the second communication was malicious, reporting the agent and the user account for further processing with respect to attempts for unauthorized user access.

3. A method comprising: obtaining, in real time, a first data stream for a first communication between a user requesting access to resources in a user account and an agent; processing, using a first machine learning model, the first data stream to generate a confidence score; in response to the confidence score exceeding a confidence threshold, generating a sandbox context for the user account, the sandbox context configured to simulate output indicative of resource access being successful; in response to obtaining a second data stream for a second communication for the sandbox context, processing, using a second machine learning model, the second data stream to determine whether the second communication between the agent and the user was malicious; and in response to determining that the second communication was not malicious, removing the user account from the sandbox context and effecting grant of resource access.

4. The method of any one of the preceding embodiments, wherein the first machine learning model takes as input at least a portion of the first data stream for the first communication and a context vector comprising a location of the user, a current time, the user account, or the access to resources being requested.

5. The method of any one of the preceding embodiments, wherein the sandbox context is configured to simulate output comprising a receipt indicating that resource access was successful, and wherein the sandbox context does not transfer any resources in association with the user account.

6. The method of any one of the preceding embodiments, wherein in response to determining that the second communication was not malicious, effecting grant of resource access comprises: requesting confirmation of the request for grant of resource access from the user; and transmitting, to a resource access system, a request for grant of resource access.

7. The method of any one of the preceding embodiments, wherein the sandbox context is configured to simulate output comprising a decoy passcode which grants the user access to the user account and which disables transferring any resources in association with the user account.

8. The method of any one of the preceding embodiments, wherein in response to determining that the second communication was not malicious, effecting grant of resource access comprises: adding the decoy passcode to a list of known authentication methods associated with the user account and enabling transferring resources in association with the user account.

9. The method of any one of the preceding embodiments, wherein the sandbox context is configured to simulate output comprising a notice indicating that resource access will be granted at a specified future time.

10. The method of any one of the preceding embodiments, wherein in response to determining that the second communication was not malicious, effecting grant of resource access comprises: sending a request to a clearinghouse system to implement the grant of resource access at the specified future time.

11. The method of any one of the preceding embodiments, wherein the user account is disconnected from the first communication during the sandbox context and replaced by a first voice model trained on the user's voice, wherein the first voice model continues the second communication during the sandbox context to determine whether the agent has malicious intent.

12. The method of any one of the preceding embodiments, wherein the agent is disconnected from the first communication during the sandbox context and replaced by a second voice model trained on the agent's voice, wherein the second voice model continues the second communication during the sandbox context to determine whether the user has malicious intent.

13. The method of any one of the preceding embodiments, wherein the second machine learning model takes as input the second data stream, a user context vector, and an agent context vector, wherein the user context vector comprises past activity in the user account and past requests for resource access associated with the user account, and wherein the agent context vector comprises past requests for resource access associated with the agent.

14. One or more non-transitory computer-readable media storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for preventing unauthorized resource access by simulating communications from a service to client devices associated with user accounts assigned a sandbox context, the system comprising:
   one or more processors; and
   one or more non-transitory, computer-readable media comprising instructions that, when executed by the one or more processors, cause operations comprising:
   obtaining, in real time, a first data stream for a first communication between a user associated with a user account and an agent of a service;
   processing, using a first machine learning model, the first data stream to generate a confidence score regarding whether to assign a sandbox context to the user account, the first machine learning model trained to detect in real time from the first data stream a malicious intent of the user to obtain unauthorized resource access from the service;
   in response to the confidence score exceeding a confidence threshold, generating a sandbox context for the user account, the sandbox context configured to receive input from the agent or the user related to resource access and simulate output indicative of resource access being successful, wherein the simulated output includes user-facing communication but does not affect grant of resource access by the service;
   in response to obtaining a second data stream for a second communication for the sandbox context, processing, using a second machine learning model, the second data stream to determine whether the second communication between the agent and the user was malicious due to the user obtaining unauthorized resource access from the service, wherein the user account is disconnected from the first communication during the sandbox context and replaced by a first voice model trained on the user's voice, wherein the first voice model continues the second communication during the sandbox context to determine whether the agent has malicious intent;
   in response to determining that the second communication was not malicious, removing the user account from the sandbox context and affecting grant of resource access by the service; and
   in response to determining that the second communication was malicious, reporting the agent and the user account for further processing with respect to attempts for unauthorized user access.

2. A method for preventing unauthorized resource access by simulating communications to client devices associated with user accounts assigned a sandbox context, the method comprising:
   obtaining, in real time, a first data stream for a first communication between a user requesting access to resources in a user account and an agent of a service;
   processing, using a first machine learning model, the first data stream to generate a confidence score regarding whether to assign a sandbox context to the user account, wherein the first machine learning model is trained to detect, in real time from the first data stream, a malicious intent of the user to obtain unauthorized resource access from the service;
   in response to the confidence score exceeding a confidence threshold, generating a sandbox context for the user account, the sandbox context configured to receive input from the agent or the user related to resource access and simulate output indicative of resource access being successful, wherein the simulated output includes user-facing communication but does not affect grant of resource access by the service;
   in response to obtaining a second data stream for a second communication for the sandbox context, processing, using a second machine learning model, the second data stream to determine whether the second communication between the agent and the user was malicious, wherein the user account is disconnected from the first communication during the sandbox context and replaced by a first voice model trained on the user's voice, wherein the first voice model continues the second communication during the sandbox context to determine whether the agent has malicious intent;
   in response to determining that the second communication was not malicious, removing the user account from the sandbox context and affecting grant of resource access; and
   in response to determining that the second communication was malicious, reporting the agent and the user account for further processing with respect to attempts for unauthorized user access.

3. The method of claim 2, wherein the first machine learning model takes as input at least a portion of the first data stream for the first communication and a context vector comprising a location of the user, a current time, the user account, or the access to resources being requested.

4. The method of claim 2, wherein the sandbox context is configured to simulate output comprising a receipt indicating that resource access was successful, and wherein the sandbox context does not transfer any resources in association with the user account.

5. The method of claim 4, wherein in response to determining that the second communication was not malicious, affecting grant of resource access comprises:
   requesting confirmation of the request for grant of resource access from the user; and
   transmitting, to a resource access system, a request for grant of resource access.

6. The method of claim 2, wherein the sandbox context is configured to simulate output comprising a decoy passcode which grants the user access to the user account and which disables transferring any resources in association with the user account.

7. The method of claim 6, wherein in response to determining that the second communication was not malicious, affecting grant of resource access comprises:
adding the decoy passcode to a list of known authentication methods associated with the user account and enabling transferring resources in association with the user account.

8. The method of claim 2, wherein the sandbox context is configured to simulate output comprising a notice indicating that resource access will be granted at a specified future time.

9. The method of claim 8, wherein in response to determining that the second communication was not malicious, affecting grant of resource access comprises:
sending a request to a clearinghouse system to implement the grant of resource access at the specified future time.

10. The method of claim 2, wherein the agent is disconnected from the first communication during the sandbox context and replaced by a second voice model trained on the agent's voice, wherein the second voice model continues the second communication during the sandbox context to determine whether the user has malicious intent.

11. The method of claim 2, wherein the second machine learning model takes as input the second data stream, a user context vector, and an agent context vector, wherein the user context vector comprises past activity in the user account and past requests for resource access associated with the user account, and wherein the agent context vector comprises past requests for resource access associated with the agent.

12. One or more non-transitory computer-readable media comprising instructions that, when executed by one or more processors, cause operations comprising:
obtaining, in real time, a first data stream for a first communication between a user requesting access to resources in a user account and an agent of a service;
processing, using a first machine learning model, the first data stream to generate a confidence score regarding whether to assign a sandbox context to the user account, wherein the first machine learning model is trained to detect in real time from the first data stream a malicious intent of the user to obtain unauthorized resource access from the service;
in response to the confidence score exceeding a confidence threshold, generating a sandbox context for the user account, the sandbox context configured to receive input from the agent or the user related to resource access and simulate output indicative of resource access being successful, wherein the simulated output includes user-facing communication but does not affect grant of resource access by the service;
in response to obtaining a second data stream for a second communication for the sandbox context, processing, using a second machine learning model, the second data stream to determine whether the second communication between the agent and the user was malicious, wherein the user account is disconnected from the first communication during the sandbox context and replaced by a first voice model trained on the user's voice wherein the first voice model continues the second communication during the sandbox context to determine whether the agent has malicious intent;
in response to determining that the second communication was not malicious, removing the user account from the sandbox context and affecting grant of resource access; and
in response to determining that the second communication was malicious, reporting the agent and the user account for further processing with respect to attempts for unauthorized user access.

13. The one or more non-transitory computer-readable media of claim 12, wherein the first machine learning model takes as input at least a portion of the first data stream for the first communication and a context vector comprising a location of the user, a current time, the user account, or the access to resources being requested.

14. The one or more non-transitory computer-readable media of claim 12, wherein the sandbox context configured to simulate output comprising a receipt indicating that resource access was successful, and wherein the sandbox context does not transfer any resources in association with the user account.

15. The one or more non-transitory computer-readable media of claim 14, wherein in response to determining that the second communication was not malicious, affecting grant of resource access comprises:
requesting confirmation of the request for grant of resource access from the user; and
transmitting, to a resource access system, a request for grant of resource access.

16. The one or more non-transitory computer-readable media of claim 12, wherein the sandbox context is configured to simulate output comprising a notice indicating that resource access will be granted at a specified future time.

17. The one or more non-transitory computer-readable media of claim 16, wherein in response to determining that the second communication was not malicious, affecting grant of resource access comprises:
sending a request to a clearinghouse system to implement the grant of resource access at the specified future time.

18. The one or more non-transitory computer-readable media of claim 12, wherein the user account is disconnected from the first communication during the sandbox context and replaced by a first voice model trained on the user's voice, wherein the first voice model continues the second communication during the sandbox context to determine whether the agent has malicious intent.

19. The one or more non-transitory computer-readable media of claim 12, wherein the second machine learning model takes as input the second data stream, a user context vector, and an agent context vector, wherein the user context vector comprises past activity in the user account and past requests for resource access associated with the user account, and wherein the agent context vector comprises past requests for resource access associated with the agent.

* * * * *